US012084303B2

(12) United States Patent
Kurokawa

(10) Patent No.: US 12,084,303 B2
(45) Date of Patent: Sep. 10, 2024

(54) FEEDER EQUIPPED WITH ACTUATOR HAVING REFLECTIVE SURFACE WHERE SPACE PROPAGATING ENERGY REFLECTS AND PIVOTABLE BY ABUTMENT AGAINST SHEET BEING CONVEYED AND IMAGE FORMING APPARATUS

(71) Applicant: KYOCERA Document Solutions Inc., Osaka (JP)

(72) Inventor: Yuichiro Kurokawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 169 days.

(21) Appl. No.: 17/964,064

(22) Filed: Oct. 12, 2022

(65) Prior Publication Data

US 2023/0130002 A1 Apr. 27, 2023

(30) Foreign Application Priority Data

Oct. 22, 2021 (JP) ................................ 2021-173004

(51) Int. Cl.

| | |
|---|---|
| ***B65H 7/02*** | (2006.01) |
| ***B41J 11/42*** | (2006.01) |
| ***G03G 15/00*** | (2006.01) |

(52) U.S. Cl.

CPC ................ *B65H 7/02* (2013.01); *B41J 11/42* (2013.01); *G03G 15/6502* (2013.01); *B65H 2511/13* (2013.01); *B65H 2511/17* (2013.01); *B65H 2553/30* (2013.01)

(58) Field of Classification Search

CPC ........ B65H 7/02; B65H 7/14; B65H 2511/13; B65H 2515/81; B65H 2553/30; B65H 2553/41; B65H 2553/412; B65H 2553/414; B65H 2553/61; B41J 11/0095; G03G 2215/00611; G03G 2215/00637

USPC .................................. 270/58.02; 271/265.04

See application file for complete search history.

(56) References Cited

U.S. PATENT DOCUMENTS 7,185,885 B2 * 3/2007 Chelvayohan ....... B41J 11/0095 271/38
11,691,833 B2 * 7/2023 Nishii ................. B65H 3/0669 270/1.01

FOREIGN PATENT DOCUMENTS

JP H08259038 A 10/1996

* cited by examiner

*Primary Examiner* — Leslie A Nicholson, III

(74) *Attorney, Agent, or Firm* — IP Business Solutions, LLC

(57) ABSTRACT

A feeder includes a conveyance path, a conveyance roller that conveys a sheet along the conveyance path, a transmitter that emits a space propagating energy, a receiver that receives a reflected energy obtained by reflection of the space propagating energy, and an actuator mounted pivotably on a pivot shaft and including first and second legs extending in different directions from the pivot shaft. The first leg is disposed to extend to the conveyance path and abut against the sheet being conveyed along the conveyance path. The second leg has a reflective surface crossing a path of the space propagating energy. The actuator is pivoted by abutment of the sheet against the first leg. The reflective surface is formed so that the reflected energy obtained by the reflection of the space propagating energy on the reflective surface enters the receiver regardless of an angle of pivotal movement of the actuator.

9 Claims, 11 Drawing Sheets

FEEDER EQUIPPED WITH ACTUATOR HAVING REFLECTIVE SURFACE WHERE SPACE PROPAGATING ENERGY REFLECTS AND PIVOTABLE BY ABUTMENT AGAINST SHEET BEING CONVEYED AND IMAGE FORMING APPARATUS

INCORPORATION BY REFERENCE

This application claims priority to Japanese Patent Application No. 2021-173004 filed on 22 Oct. 2021, the entire contents of which are incorporated by reference herein.

BACKGROUND

The present disclosure relates to feeders and image forming apparatuses.

There is generally known a recording medium identifying device equipped with a medium sensor capable of detecting the amount of sag of a trailing end of a recording medium being conveyed by a sheet feed roller.

SUMMARY

A technique improved over the aforementioned technique is proposed as one aspect of the present disclosure.

A feeder according to an aspect of the present disclosure includes a conveyance path, a conveyance roller, a transmitter, a receiver, and an actuator. The conveyance roller conveys a sheet along the conveyance path. The transmitter emits a space propagating energy. The receiver receives a reflected energy obtained by reflection of the space propagating energy. The actuator is mounted pivotably on a pivot shaft and includes a first leg and a second leg extending in different directions from the pivot shaft. The first leg is disposed to extend to the conveyance path and abut against the sheet being conveyed along the conveyance path. The second leg has a reflective surface crossing a path of the space propagating energy. The actuator is pivoted by abutment of the sheet against the first leg. The reflective surface is formed so that the reflected energy obtained by the reflection of the space propagating energy on the reflective surface enters the receiver regardless of an angle of pivotal movement of the actuator.

DETAILED DESCRIPTION

Figure 1:
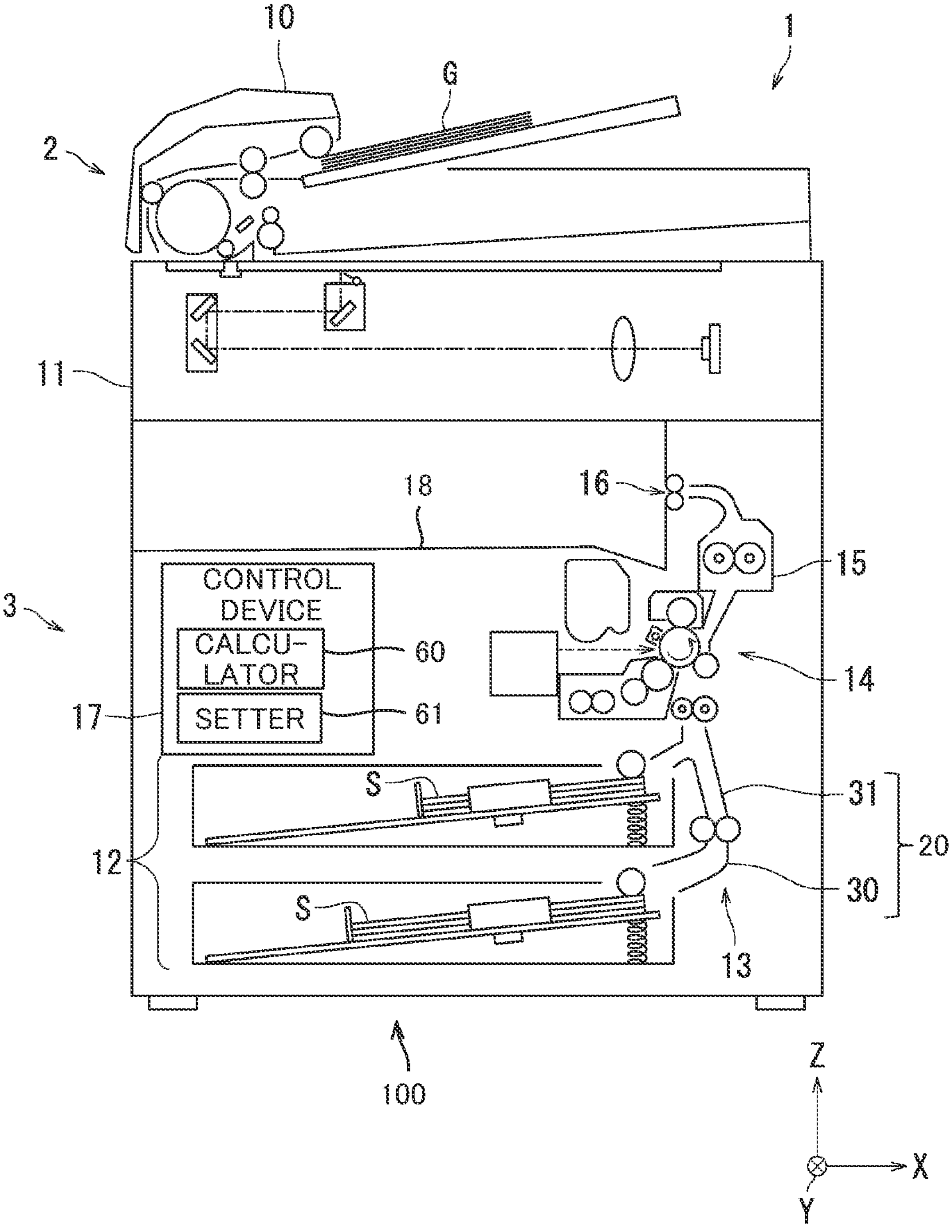
FIG. 1 is a cross-sectional view showing the structure of a multifunction peripheral including a feeder according to one embodiment of the present disclosure.

Hereinafter, a description will be given of an embodiment of the present disclosure with reference to the drawings. Throughout the drawings, the same or corresponding parts are designated by the same references and further explanation thereof will be omitted. In this embodiment, the X axis, Y axis, and Z axis perpendicular to each other are shown in the drawings. The Z axis is parallel to the vertical plane. The X and Y axes are parallel to the horizontal plane.

In this embodiment, the direction of the Z axis which is the direction of conveyance of a sheet S in an image forming device 14 may be referred to as a main scanning direction. The direction of the Y axis may be referred to as a sub-scanning direction. The direction of the X axis may be referred to as a direction orthogonal to the main scanning direction and the sub-scanning direction.

Figure 3A:
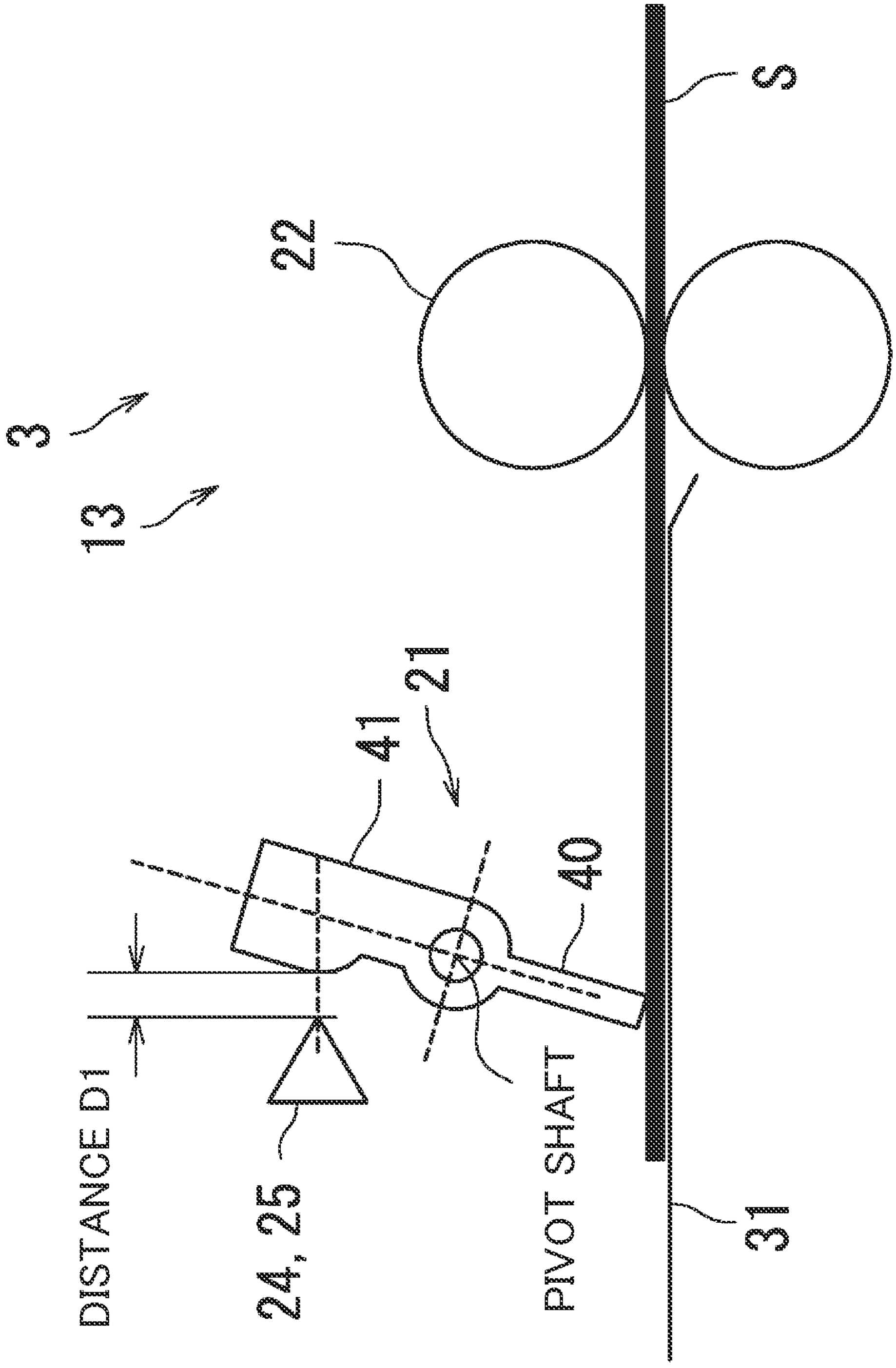
FIGS. 3A and 3B are views showing states of the feeder where the actuator is provided in a linear conveyance path.
Figure 3B:
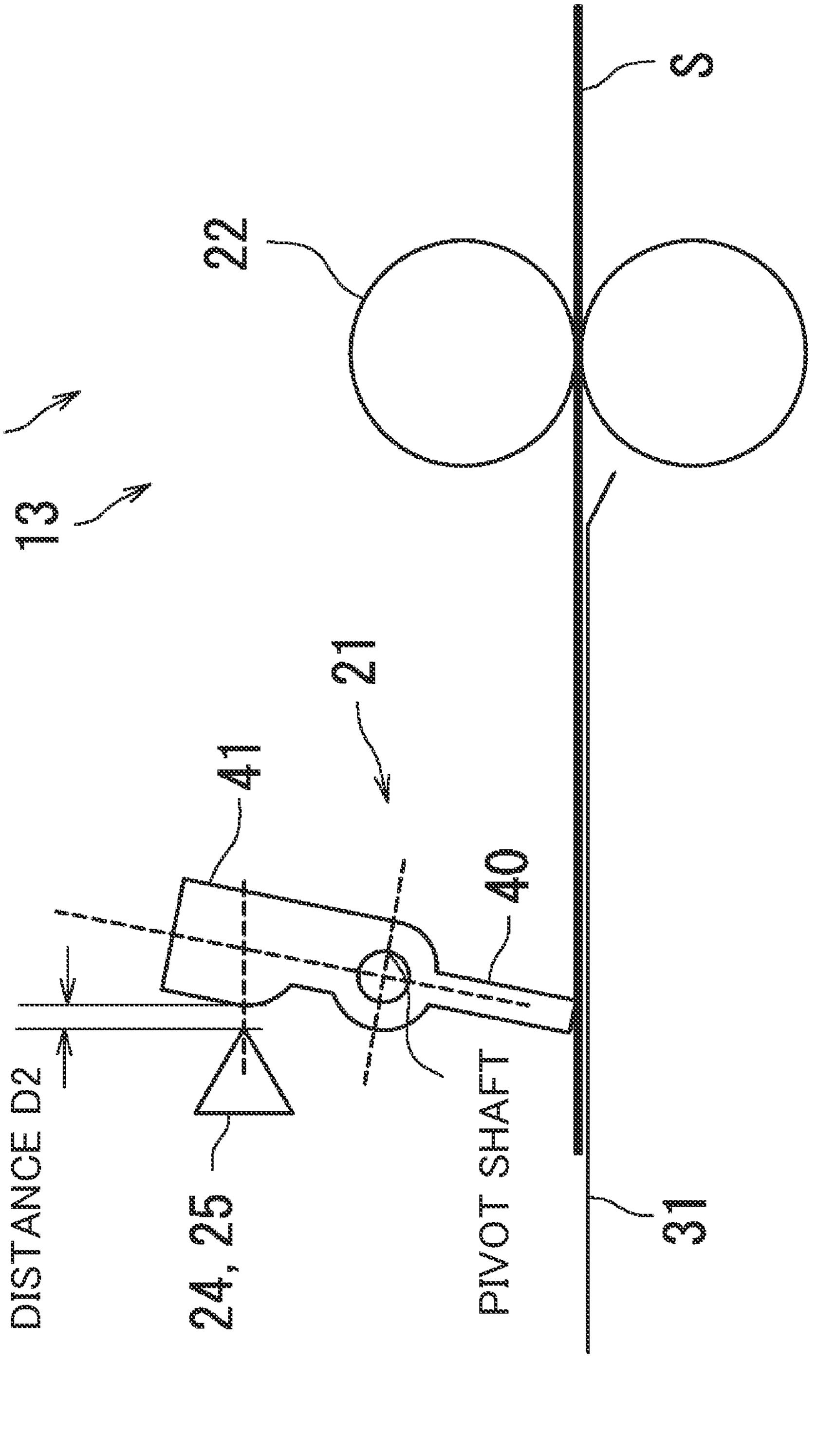
Figure 4A:
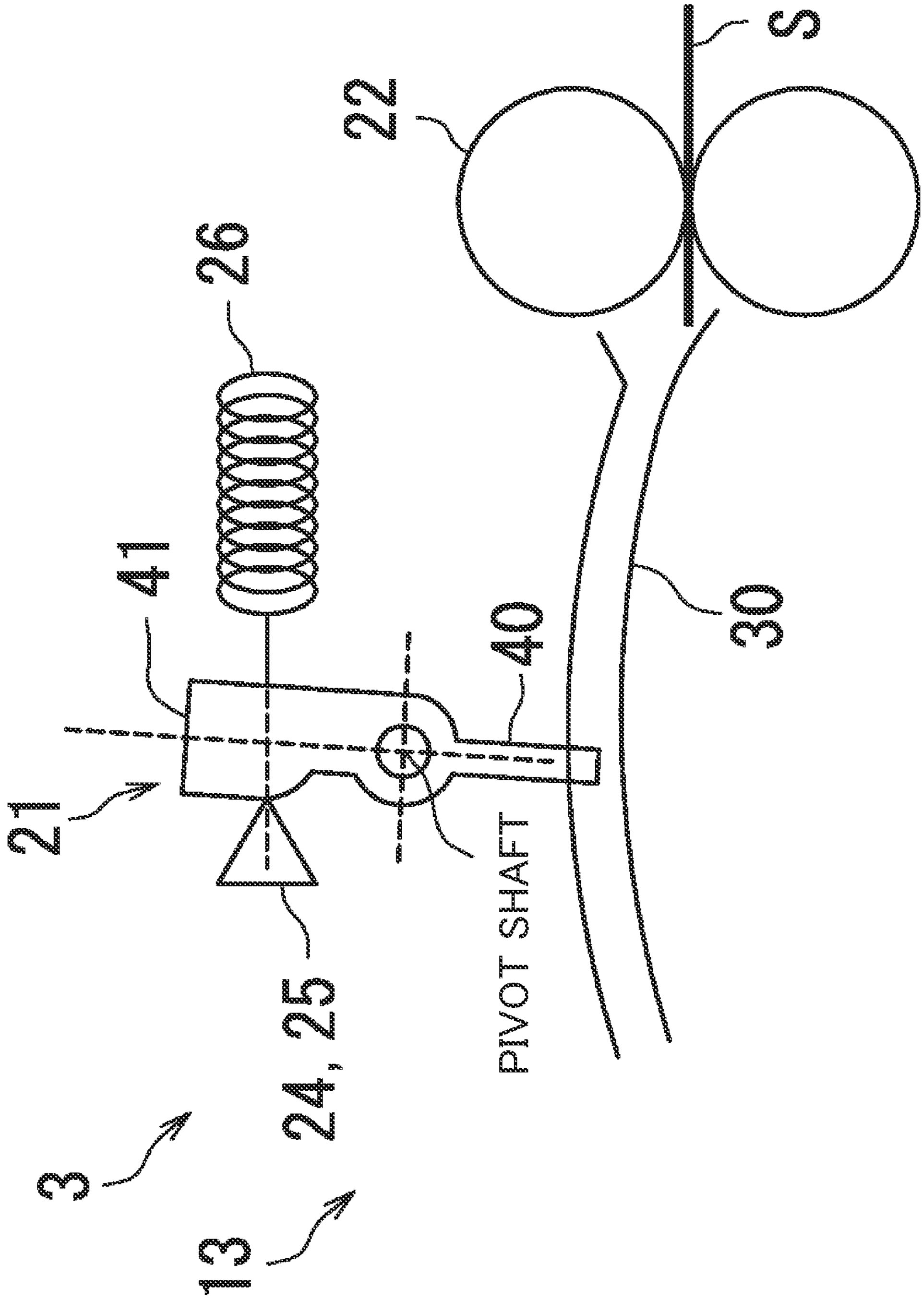
FIGS. 4A to 4C are views showing states of the feeder where the actuator is provided in a curved conveyance path.
Figure 4B:
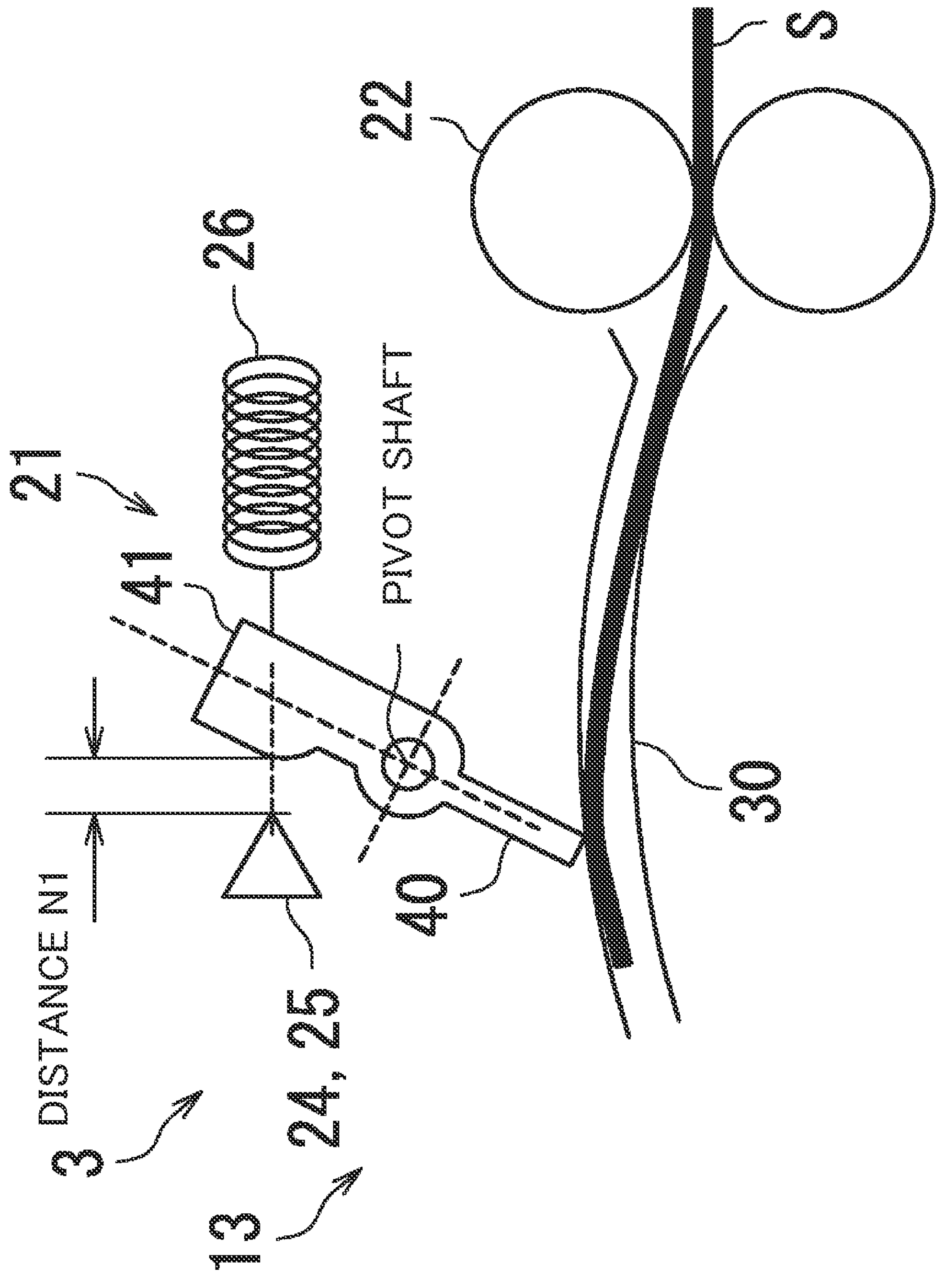
Figure 4C:
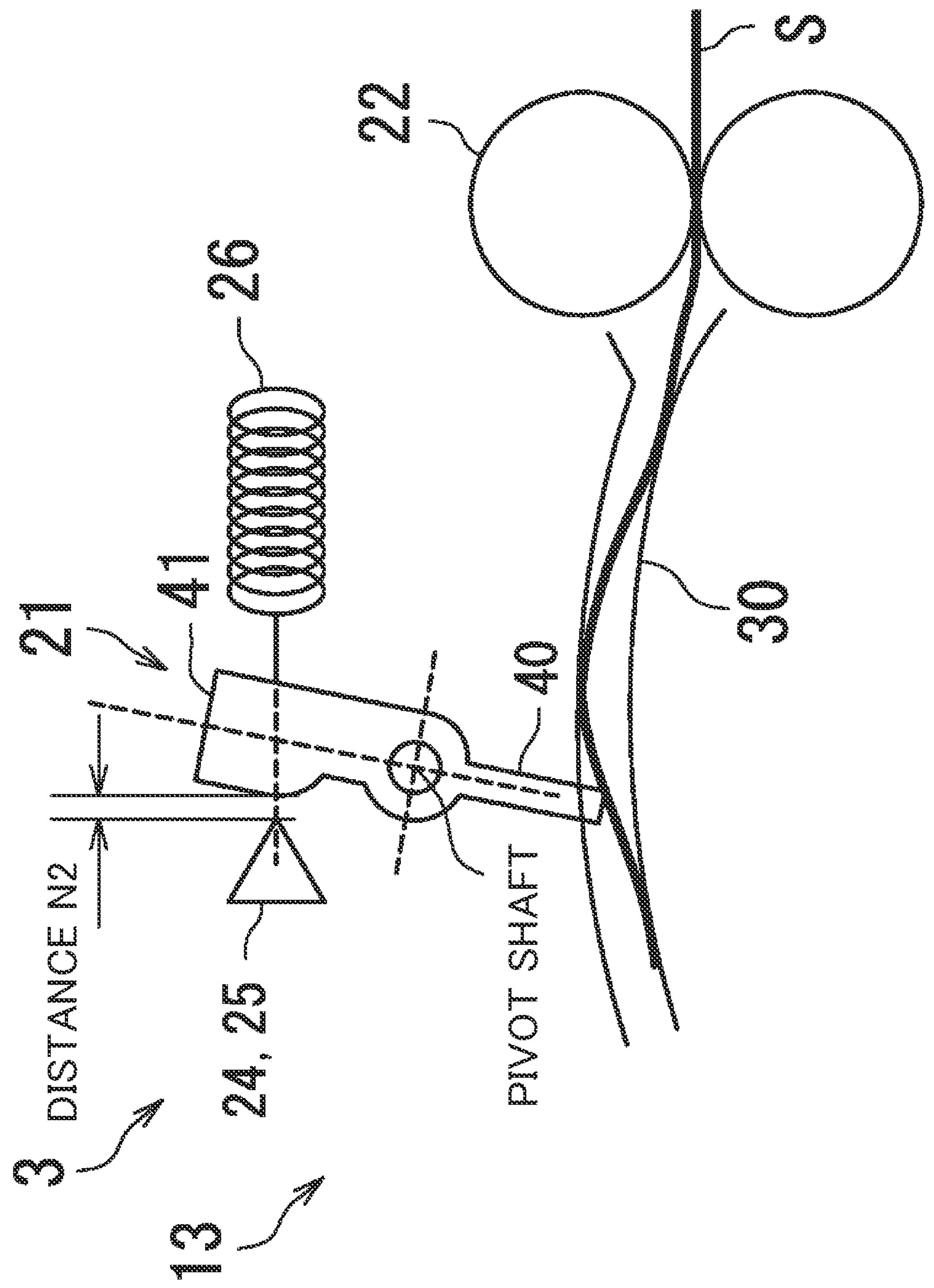
Figure 5:
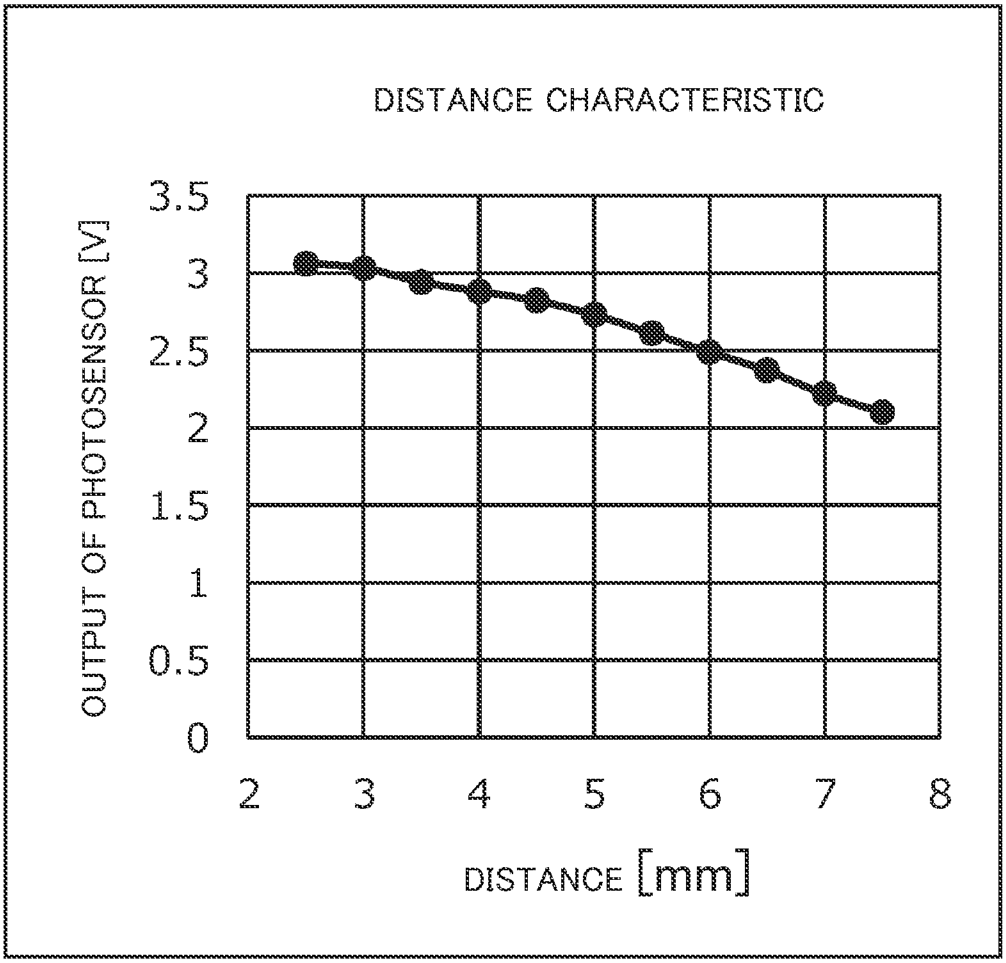
FIG. 5 is a graph showing a distance characteristic of the actuator.

With reference to FIGS. 1 to 6, a description will be given of a multifunction peripheral 1 including a feeder 100 according to an embodiment of the present disclosure. FIG. 1 is a cross-sectional view showing the structure of the multifunction peripheral 1. FIGS. 2A and 2B are views showing an actuator 21 of the feeder 100. FIGS. 3A and 3B are views showing states of the feeder 100 where the actuator 21 is provided in a linear conveyance path 31. FIGS. 4A to 4C are views showing states of the feeder 100 where the actuator 21 is provided in a curved conveyance path 30. FIG. 5 is a graph showing a distance characteristic of the actuator 21. FIGS. 6A and 6B are graphs showing the X-angle characteristic and the Y-angle characteristic, respectively, of the actuator 21.

Referring to FIG. 1, the multifunction peripheral 1 is a multifunction printer (MFP) in which a scanner, a copier, a printer, a facsimile machine, and other functions are combined together. The multifunction peripheral 1 may be, for example, a copier, a facsimile machine or a multifunction peripheral combining these functions. As shown in FIG. 1, the multifunction peripheral 1 includes a document reading device 2 and an image forming apparatus 3.

The document reading device 2 includes a document feed device 10 and an image reading device 11. The document feed device 10 includes, for example, a document tray, a document feed part, a document sensor, and a document discharge part. An example of the document feed device 10 is an ADF (auto document feeder).

The image reading device 11 includes an optical system. The optical system includes, for example, a light-emitting device, a lens, a reflecting mirror, and a light-receiving device. The image reading device 11 reads an image of an original document G being conveyed by the document feed device 10. The image reading device 11 generates image data representing the read image. An example of the image reading device 11 is a CIS (contact image sensor) scanner or a CCD (charge coupled device) scanner.

In this embodiment, the image forming apparatus 3 is an electrophotographic printer. The image forming apparatus 3 includes a sheet feed device 12, a sheet conveyance device 13, an image forming device 14, a fixing device 15, a sheet ejection device 16, and a control device 17. The sheet feed device 12 and the sheet conveyance device 13 constitutes the feeder 100. The sheet feed device 12 includes, for example, a sheet tray on which sheets S are to be placed, and a pick-up roller.

The sheet conveyance device 13 includes a conveyance path 20, an actuator 21, a conveyance roller 22, a conveyance motor, a transmitter 24, a receiver 25, and an elastic member 26. A sheet S is conveyed along the conveyance path 20. The conveyance path 20 may include a linear conveyance path 31 as shown in FIGS. 3A and 3B and/or a curved conveyance path 30 as shown in FIGS. 4A to 4C. The curved conveyance path 30 is formed in a curved shape. In this embodiment, as shown in FIG. 1, the conveyance path 20 partially consists of a curved conveyance path 30 and partially consists of a linear conveyance path 31.

Figure 2A:
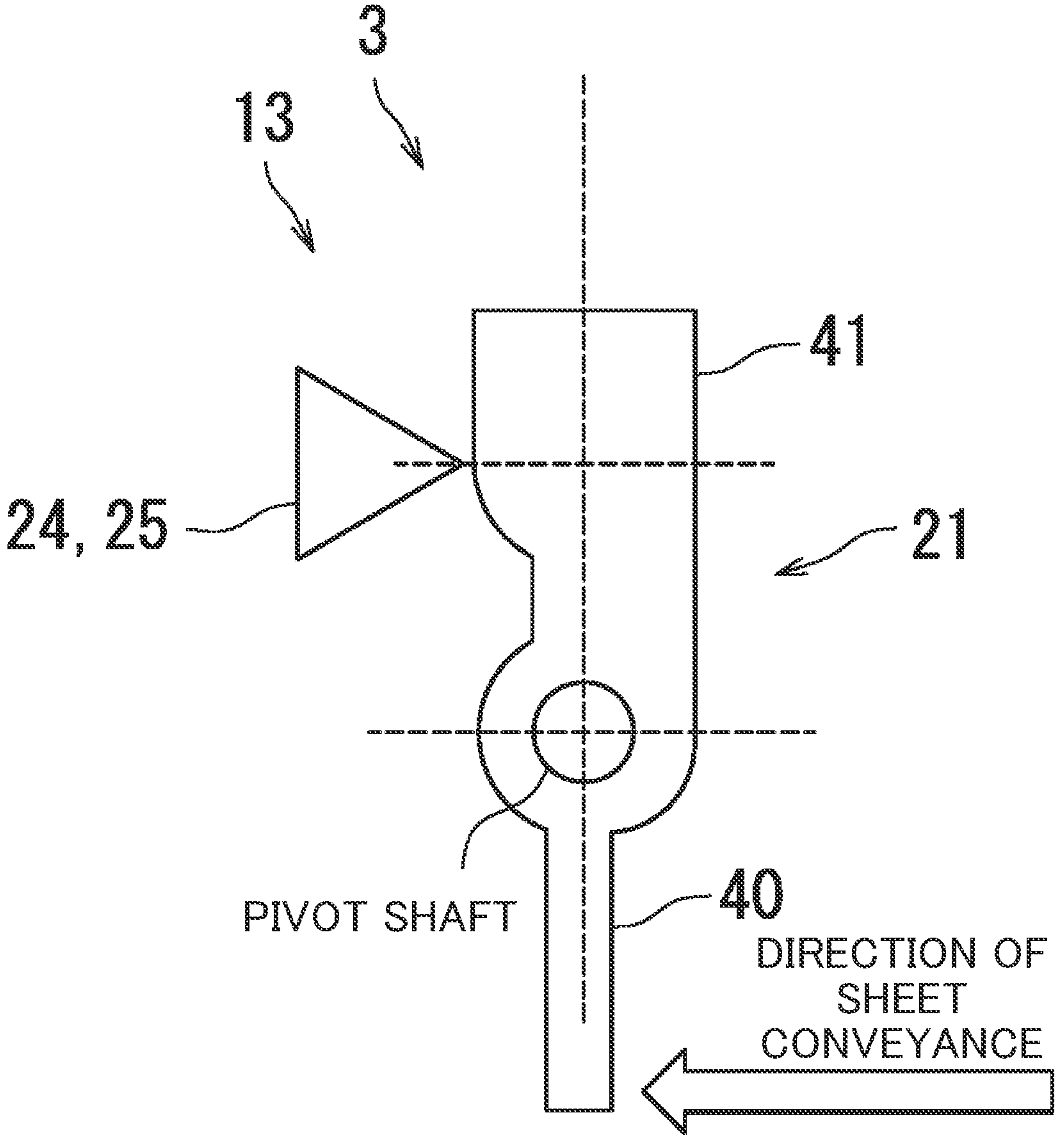
FIGS. 2A and 2B are views showing an actuator of the feeder.

Next, a detailed description will be given of the actuator 21. The actuator 21 is a detecting member for use in detecting the stiffness or thickness of a sheet S being conveyed through the conveyance path 20. As shown in FIG. 2A, the actuator 21 is mounted pivotably on a pivot shaft. The actuator 21 includes a first leg 40 and a second leg 41 extending in different directions from the pivot shaft. In the example shown in FIG. 2A, the first leg 40 and the second leg 41 extend in directions 180 degrees opposite to each other from the pivot shaft.

Figure 2B:
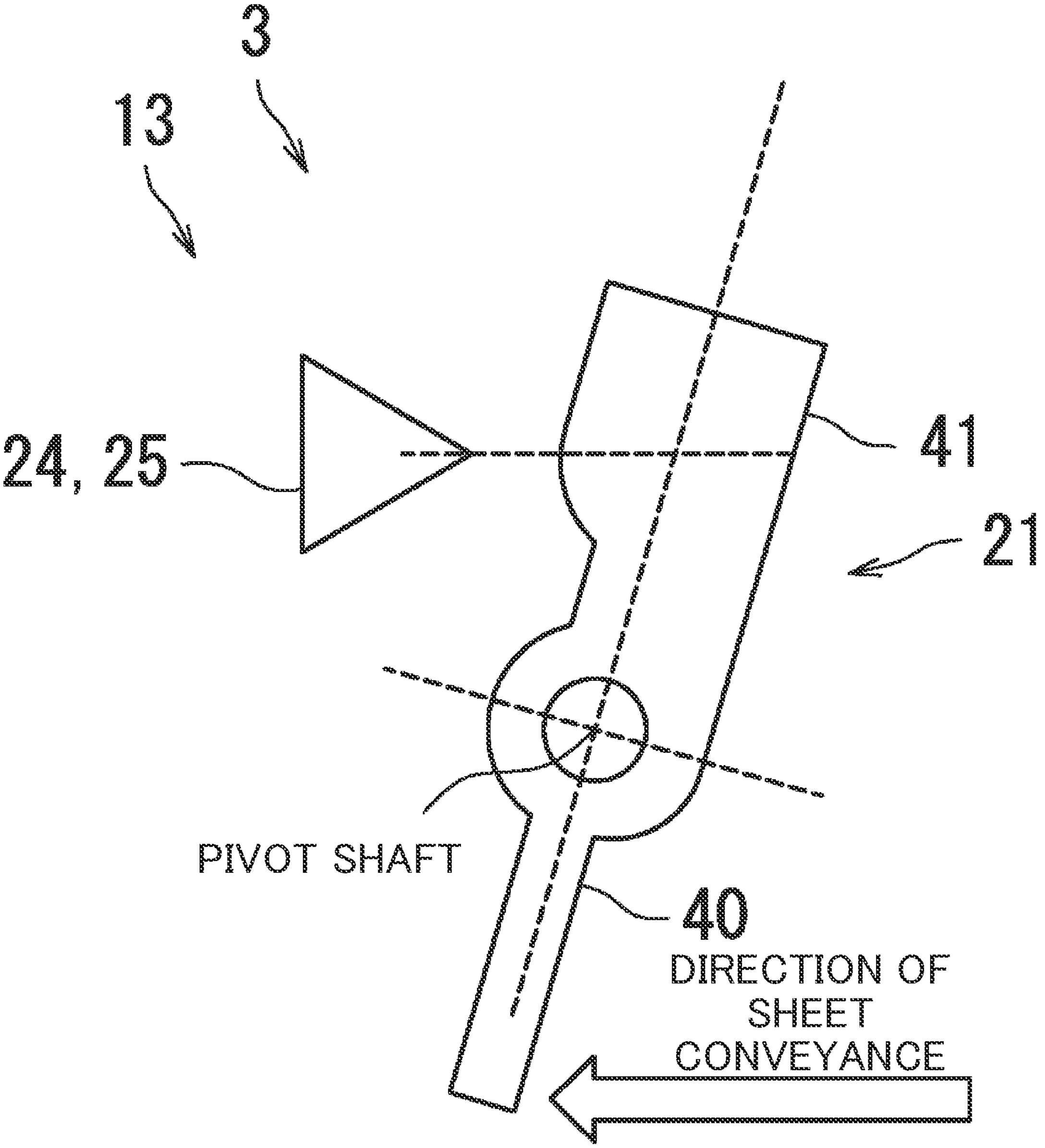

The first leg 40 is disposed to extend to the conveyance path 20 and abut against the sheet S being conveyed along the conveyance path 20. For example, as shown in FIG. 3A, the first leg 40 extends to and abuts against the linear conveyance path 31. As shown in FIGS. 2B, 3A, and 3B, the actuator 21 is pivoted by abutment of the sheet S against the first leg 40. By this pivotal movement, the actuator 21 mediates information for detecting the characteristic or type of the sheet S.

The second leg 41 crosses the path of a space propagating energy emitted from the transmitter 24. Examples of the space propagating energy include light and ultrasound. As shown in FIG. 2A, the second leg 41 has a reflective surface crossing the path of the space propagating energy. As shown in FIG. 2B, the reflective surface is formed so that a reflected energy obtained by the reflection of the space propagating energy on the reflective surface enters the receiver 25 regardless of the angle of pivotal movement of the actuator 21. The reflective surface may be formed so that the entire reflected energy enters the receiver 25 regardless of the angle of pivotal movement of the actuator 21.

In the actuator 21 in this embodiment, the reflective surface may be formed into a curved surface where the incident angle of the space propagating energy on the reflective surface is identical with the reflection angle of the reflected energy from the reflective surface. Furthermore, in the actuator 21 in this embodiment, the curved surface of the reflective surface may include a partially cylindrical shape the center of which is a point of intersection between the path of the space propagating energy and the central axis of the second leg 41 extending from the pivot shaft. Thus, the reflected energy more certainly enters the receiver 25 regardless of the angle of pivotal movement.

As shown in FIG. 3A, the conveyance roller 22 is disposed, for example, in the linear conveyance path 31. The conveyance roller 22 conveys the sheet S along the conveyance path 20. The conveyance motor drives the conveyance roller 22 into rotation. The transmitter 24 emits the space propagating energy. The receiver 25 receives the reflected energy obtained by the reflection of the space propagating energy on the reflective surface of the second leg 41 and outputs information on the received reflected energy.

Meanwhile, in the above-described general recording medium identifying device, vibrations of the recording medium during conveyance makes the distance between the medium sensor and the recording medium unstable, which presents a problem of reduced detection accuracy.

Unlike the above, in this embodiment, the actuator 21 has the above-described reflective surface and is pivoted by abutment against a sheet S being conveyed. which enables the measurement of the thickness or stiffness of the sheet S with stable accuracy based on the intensity of the reflected energy.

The transmitter 24 may be a light-emitting device that emits light. An example of the light-emitting device is an LED (light-emitting diode). The receiver 25 may be a light-receiving device that receives reflected light from the reflective surface and outputs information on the amount of reflected light as information on the received reflected energy. An example of the light-receiving device is a CCD (charge coupled device). The information on the amount of reflected light may include information showing whether the amount of reflected light is high or low.

In this embodiment, in a manner that the light-emitting device as the transmitter 24 and the light-receiving device as the receiver 25 emits and receives light, respectively, the distance D1 or D2 between the reflective surface of the second leg 41 and the receiver 25 can be measured with high accuracy.

Alternatively, the transmitter 24 may be an ultrasound transmitter. An example of the ultrasound transmitter is an electrostrictive vibrator constituted by lead zirconate titanate or the like vibrating upon application of AC voltage. The receiver 25 may be an ultrasound receiver. The ultrasound receiver receives reflected ultrasound from the reflective surface and outputs information on the amount of reflected ultrasound as information on the received reflected energy.

In this embodiment, in a manner that the ultrasound transmitter as the transmitter 24 and the ultrasound receiver as the receiver 25 emits and receives ultrasound, respectively, the distance D1 or D2 between the reflective surface of the second leg 41 and the receiver 25 can be measured with high accuracy.

For example, as shown in FIGS. 4A to 4C, when the actuator 21 is located laterally to the outer periphery of the curved conveyance path 30, the first leg 40 is disposed to enter the curved conveyance path 30 from the outer periphery of the curved conveyance path 30 and abut against a sheet S being conveyed along the curved conveyance path 30. The elastic member 26 urges the actuator 21. The elastic member 26 urges the second leg 41 of the actuator 21 in a direction against the force of the conveyed sheet S pressing the first leg 40 of the actuator 21. Alternatively, the elastic member 26 may be configured to urge the first leg 40 of the actuator 21 in a direction against the force of the conveyed sheet S pressing the first leg 40 of the actuator 21. An example of the elastic member 26 is a spring.

Generally, a sheet S has a different thickness, stiffness or other characteristics depending on the type. When a sheet S having a large thickness and a large stiffness is conveyed along the curved conveyance path 30 having a large bending stress as shown in FIG. 4A, the sheet S is conveyed while rubbing against the wall of the curved conveyance path 30 located outwardly in the direction of the curvature radius. Therefore, the first leg 40 of the actuator 21 receives a large pressing force from the sheet S. The elastic member 26 urges the second leg 41 against the pressing force of the sheet S applied to the first leg 40.

Thus, when as shown in FIG. 4B a sheet S having a large stiffness (a sheet S having a large thickness) is conveyed to the actuator 21, the second leg 41 of the actuator 21 moves a distance N1 away from the transmitter 24 and the receiver 25. The receiver 25 outputs information on the received reflected energy based on the intensity (for example, the amount of reflected ultrasound or the amount of reflected light) of the reflected energy.

On the other hand, when as shown in FIG. 4C a sheet having a small stiffness (a sheet S having a small thickness) is conveyed to the actuator 21, the sheet S yields to the force of the elastic member 26 urging the actuator 21. As a result, when the sheet S having a small stiffness is conveyed to the actuator 21, the second leg 41 of the actuator 21 moves a distance N2 away from the transmitter 24 and the receiver 25. In this case, the distance N1 is larger than the distance N2. The receiver 25 outputs information on the received reflected energy based on the intensity (for example, the amount of reflected ultrasound or the amount of reflected light) of the reflected energy.

In this embodiment, when the actuator 21 is disposed in the curved conveyance path 30, the stiffness or thickness of the sheet S can be more suitably measured because the actuator 21 includes the elastic member 26.

The image forming device 14 includes, for example, an image data input device, a charging device, an exposure device, a development device, a transfer device, and a cleaning device. The image forming device 14 forms a toner image on a sheet S based on image data.

The image forming apparatus 3 may be an inkjet printer. When the image forming apparatus 3 is an inkjet printer, the image forming device 14 includes at least an ink tank, an ink cartridge, and an ink head. The image forming device 14 forms an ink image on a sheet S based on image data. When the image forming apparatus 3 is an inkjet printer, the image forming apparatus 3 need not necessarily include the fixing device 15.

The fixing device 15 applies heat and pressure to the toner image formed on the sheet S, thus fixing the toner image on the sheet S. The fixing device 15 includes, for example, a fixing belt, a pressure roller, and a heater.

The fixing belt is a hollow, cylindrical belt. The pressure roller is pressed against the fixing belt to form a nip with the fixing belt. When driven into rotation by a drive device, the pressure roller rotates the fixing belt.

The heater is supplied with electric power from a power source to apply heat to the fixing belt. The heater is disposed in proximity to the inner peripheral surface of the fixing belt. When passing through the nip, the sheet S being conveyed by the sheet conveyance device 13 is heated by the heater. As a result, the toner image is fixed on the sheet S.

The sheet ejection device 16 ejects the sheet S to the outside of the housing of the multifunction peripheral 1. The sheet ejection device 16 includes an ejection roller and a sheet output tray 18. The ejection roller ejects to the sheet output tray 18 the sheet S conveyed from the fixing device 15 by the conveyance roller 22. Ejected sheets S are stacked on the sheet output tray 18.

The control device 17 controls the components of the multifunction peripheral 1 or the image forming apparatus 3. The control device 17 includes a processor. An example of the processor is a CPU (central processing unit). The control device 17 functions, through the processor executing a control program stored in a ROM (read only memory) or an HDD (hard disk drive), as a calculator 60 and a setter 61. The calculator 60 and the setter 61 can be implemented, for example, by an ASIC (application specific integrated circuit).

The calculator 60 calculates the stiffness or thickness of a sheet S based on information on the amount of reflected light output by the light-receiving device serving as the receiver 25. Alternatively, the calculator 60 calculates the stiffness or thickness of a sheet S based on information on the amount of reflected ultrasound output by the ultrasound receiver serving as the receiver 25.

The setter 61 configures settings for the components of the image forming apparatus 3 equipped with the sheet conveyance device 13, based on the stiffness or thickness of the sheet S calculated by the calculator 60. For example, the setter 61 configures settings for the image forming device 14 based on the calculated stiffness or thickness of the sheet S.

In this embodiment, by calculating the stiffness or thickness of the sheet S, the settings for the components of the image forming apparatus 3 equipped with the sheet conveyance device 13 can be suitably configured.

Next, with reference to FIG. 5, a description will be given of the distance characteristic between the reflective surface of the second leg 41 and the receiver 25. In FIG. 5, the horizontal axis indicates the distance between the reflective surface of the second leg 41 of the actuator 21 and the receiver 25. The vertical axis indicates the output of the receiver 25.

As shown in FIG. 5, as the reflective surface of the second leg 41 approaches the receiver 25, the output of the receiver 25 increases. As the reflective surface of the second leg 41 moves away from the receiver 25, the output of the receiver 25 decreases. The distance characteristic of the reflective surface of the second leg 41 with the receiver 25 is a downward-sloping, approximately linear characteristic.

Figure 6A:
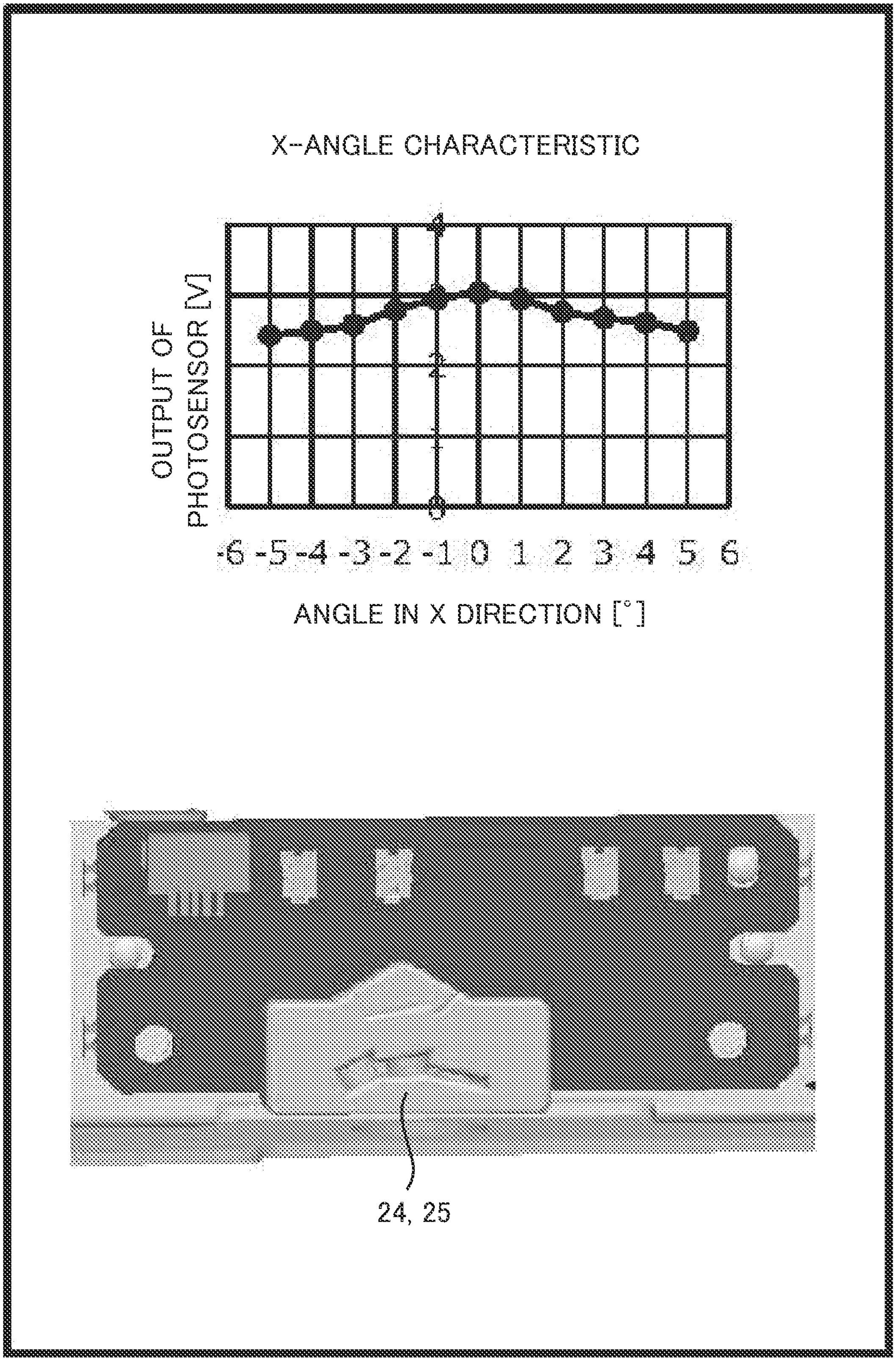
FIGS. 6A and 6B are graphs showing the X-angle characteristic and the Y-angle characteristic, respectively, of the actuator.
Figure 6B:
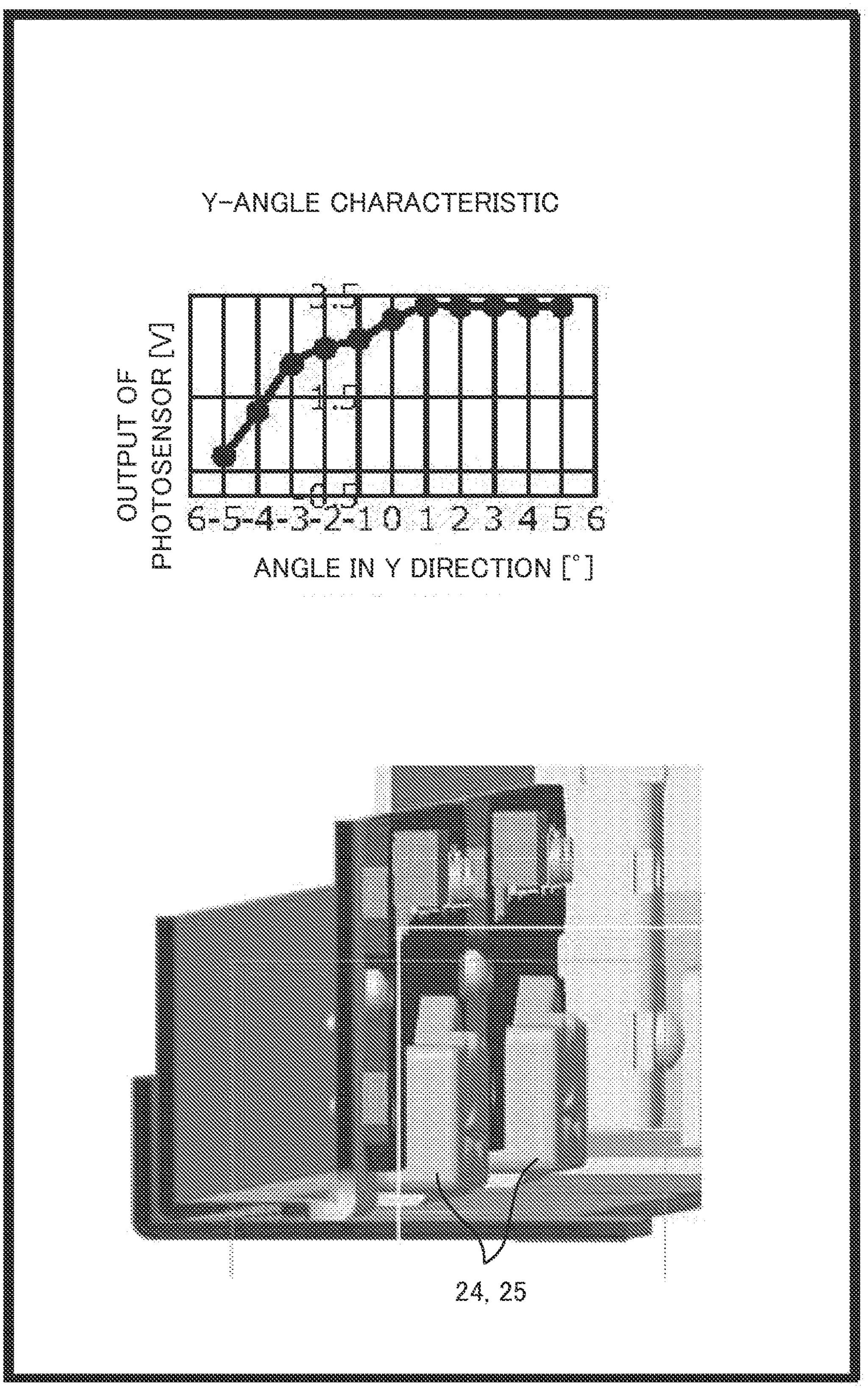

Next, with reference to FIGS. 6A and 6B, a description will be given of the angle characteristics representing the relationship between the tilt of the transmitter 24 and the output of the receiver 25. FIGS. 6A and 6B show the X-angle characteristic and the Y-angle characteristic, respectively, of the receiver 25 when the position of the actuator 21 shown in FIG. 2A is fixed and the positions of the transmitter 24 and the receiver 25 are changed.

FIGS. 6A and 6B also show how the transmitter 24 and the receiver 25 are mounted to a substrate. As shown in FIG. 6A, when the transmitter 24 and the receiver 25 are in their horizontal positions in the X direction (the positions where their angles in the X direction are zero degrees), the X-angle characteristic of the receiver 25 exhibits a highest value. When the transmitter 24 and the receiver 25 tilt in the X direction (to the right or left of the plane of the figure), the output of the receiver 25 decreases.

On the other hand, when as shown in FIG. 6B the transmitter 24 and the receiver 25 tilt toward one side in the Y direction (the front of the plane of the figure), the output of the receiver 25 increases. When the transmitter 24 and the receiver 25 tilt toward the other side in the Y direction (the back of the plane of the figure), the output of the receiver 25 decreases.

As shown in FIGS. 6A and 6B, when the transmitter 24 and the receiver 25 are in their horizontal positions in the X direction (the right and left direction of the plane of the figure), i.e., their angles in the X direction are zero degrees, and the transmitter 24 and the receiver 25 are in their horizontal positions in the Y direction (the front and back direction of the plane of the figure), i.e., their angles in the Y direction are zero degrees, the X-angle characteristic and Y-angle characteristic of the receiver 25 exhibit respective highest values.

Therefore, when, with the transmitter 24 and the receiver 25 in the fixed positions, the reflective surface of the second leg 41 changes to keep a position where the angle in the X direction and the angle in the Y direction are zero degrees with respect to the transmitter 24 and the receiver 25, the receiver 25 exhibits the distance characteristic shown in FIG. 5.

The above description has been given of an embodiment of the present disclosure with reference to the drawings. However, the present disclosure is not limited to the above embodiment and can be implemented in various forms without departing from the gist of the invention. For the sake of ease of understanding, the drawings are schematically given by mainly showing components. The number of components and so on shown in the drawings are different from those of actual components for convenience of creation of the drawings. The components described in the above embodiment are merely illustrative, not particularly limited, and can be changed variously without substantially departing from the effects of the present disclosure.

INDUSTRIAL APPLICABILITY

The present disclosure is applicable to the field of feeders.

While the present disclosure has been described in detail with reference to the embodiments thereof, it would be apparent to those skilled in the art the various changes and modifications may be made therein within the scope defined by the appended claims.

What is claimed is:

1. A feeder comprising:
- a conveyance path;
- a conveyance roller that conveys a sheet along the conveyance path;
- a transmitter that emits a space propagating energy;
- a receiver that receives a reflected energy obtained by reflection of the space propagating energy; and
- an actuator mounted pivotably on a pivot shaft and including a first leg and a second leg extending in different directions from the pivot shaft,
- wherein the first leg is disposed to extend to the conveyance path and abut against the sheet being conveyed along the conveyance path,
- the second leg has a reflective surface crossing a path of the space propagating energy,
- the actuator is pivoted by abutment of the sheet against the first leg, and
- the reflective surface is formed so that the reflected energy obtained by reflection of the space propagating energy on the reflective surface enters the receiver regardless of an angle of pivotal movement of the actuator.

2. The feeder according to claim 1, wherein the reflective surface is formed into a curved surface where an incident angle of the space propagating energy on the reflective surface is identical with a reflection angle of the reflected energy from the reflective surface.

3. The feeder according to claim 2, wherein the curved surface of the reflective surface includes a partially cylindrical shape a center of which is a point of intersection between the path of the space propagating energy and a central axis of the second leg extending from the pivot shaft.

4. The feeder according to claim 1, wherein
- the conveyance path includes a curved conveyance path formed in a curved shape,
- the actuator is disposed laterally to an outer periphery of the curved conveyance path,
- the first leg enters the curved conveyance path from the outer periphery of the curved conveyance path and abuts against the sheet being conveyed along the curved conveyance path, and
- the feeder further comprises an elastic member that urges the second leg in a direction against a force of the conveyed sheet pressing the first leg.

5. The feeder according to claim 1, wherein
- the transmitter is a light-emitting device that emits light, and
- the receiver is a light-receiving device that receives light reflected from the reflective surface and outputs information on amount of the reflected light.

6. The feeder according to claim 5, further comprising a control device that includes a processor and functions, through the processor executing a control program, as a calculator that calculates a stiffness or thickness of the sheet based on the information on amount of the reflected light.

7. The feeder according to claim 1, wherein
- the transmitter is an ultrasound transmitter that emits ultrasound, and
- the receiver is an ultrasound receiver that receives ultrasound reflected from the reflective surface and outputs information on amount of the reflected ultrasound.

8. The feeder according to claim 7, further comprising a control device that includes a processor and functions, through the processor executing a control program, as a calculator that calculates a stiffness or thickness of the sheet based on the information on amount of the reflected ultrasound.

9. An image forming apparatus comprising:
- the feeder according to claim 6; and
- an image forming device that forms an image on the sheet,
- wherein the control device configures settings for the image forming device based on the stiffness or thickness of the sheet calculated by the calculator.

* * * * *